United States Patent
Kleban et al.

(10) Patent No.: US 6,797,670 B2
(45) Date of Patent: Sep. 28, 2004

(54) MICROCAPSULES HAVING POLYUREA WALLS

(75) Inventors: Martin Kleban, Leverkusen (DE); Günter Klug, Langenfeld (DE); Jürgen Weisser, Dormagen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/975,787

(22) Filed: Oct. 11, 2001

(65) Prior Publication Data

US 2002/0079599 A1 Jun. 27, 2002

(30) Foreign Application Priority Data

Oct. 16, 2000 (DE) .......................................... 100 51 194

(51) Int. Cl.[7] .............................................. B41M 5/165
(52) U.S. Cl. .................................. 503/215; 428/402.21
(58) Field of Search ...................... 428/402.21, 402.22; 503/215

(56) References Cited

U.S. PATENT DOCUMENTS

| | | | |
|---|---|---|---|
| 4,783,196 A | 11/1988 | Eckstein et al. | ............... 8/527 |
| 4,831,141 A | 5/1989 | Berneth et al. | ............... 544/90 |
| 4,835,270 A | 5/1989 | Berneth | ........................ 544/73 |
| 4,923,641 A | 5/1990 | Eckstein et al. | ............... 544/86 |
| 5,017,707 A | 5/1991 | Berneth et al. | ............. 548/455 |
| 5,164,126 A | 11/1992 | Kalishek et al. | ............. 264/4.7 |
| 5,225,118 A | 7/1993 | Juang et al. | .................. 264/4.7 |
| 5,401,443 A | 3/1995 | Nagano et al. | ............... 264/4.7 |
| 5,421,870 A | 6/1995 | Scartazzini et al. | ........ 106/21 R |
| 5,635,211 A | 6/1997 | Nehen et al. | ................ 424/489 |
| 5,643,506 A | 7/1997 | Rourke | ........................ 264/4.1 |
| 6,020,066 A | 2/2000 | Weisser et al. | ......... 428/402.21 |

FOREIGN PATENT DOCUMENTS

EP      0 780 154      6/1997

*Primary Examiner*—Bruce Hess
(74) *Attorney, Agent, or Firm*—Godfried R. Akorli; Diderico van Eyl

(57) ABSTRACT

The invention relates to microcapsules for which the walls comprise reaction products of polyisocyanates, guanidine compounds, and optionally amines, wherein the polyisocyanates have an isocyanurate content of at least 30% by weight, based on polyisocyanate, and the walls comprise on average less than 9% by weight, based on the total weight of the microcapsule.

14 Claims, No Drawings

MICROCAPSULES HAVING POLYUREA WALLS

BACKGROUND OF THE INVENTION

The present invention relates to microcapsules having walls comprising polyurea obtained by reaction of polyisocyanates, guanidine compounds and optionally amines, to processes for producing these microcapsules, and to the carbonless copy papers produced from the microcapsules.

Carbonless copy papers are coated on their back with a layer of microcapsules. The microcapsules contain a solution in oil of a color former, so called because it is capable, in the presence of acidic developers, of effectuating a change in color from colorless to colored within a few seconds.

When a capsule-coated paper, then, is placed on a developer-primed paper in such a way that the capsules are in direct contact with the developer, a colored image will appear on the developer side on writing on the back of the capsuled paper, causing the capsules to burst under the pressure of the writing implement and to release the color former.

In one version of this process, papers coated with capsules are directly aftercoated with a developer layer (to provide two-layer self-contained paper) or capsules are directly mixed with developer and coated onto paper (to provide single-layer self-contained paper). In the case of these SC papers, an image can be created directly on the coated side by mechanical pressure, for example, by placing a sheet of uncoated paper on top and writing on it.

Carbonless copy papers are used worldwide, differing essentially only in the nature of the microcapsule wall used. Customary are gelatin, melamine-formaldehyde, and polyurethane or polyurea capsules. Polyurea capsules are customarily formed by an interfacial polyaddition process, the basic traits of which will now be outlined.

Generally, a suitable color former is dissolved in an oil by heating and a polyisocyanate is added. In addition, an aqueous solution of a protective colloid, for example, polyvinyl alcohol, is prepared. An emulsifying apparatus is then used to convert the oil and water phases into a fine oil-in-water emulsion for which the particle size is substantially equal to the average diameter of the desired capsules.

In a concurrent or subsequent operation, this emulsion is admixed with an aqueous solution of an amine or an amine-like substance (hereinafter referred to as "crosslinker"), which causes a rapid reaction of oil-dissolved isocyanate to take place at the oil/water phase boundary, to form a thin polyurea film. This polyaddition can be made virtually quantitative by supplying heat and allowing appropriate time for reaction. This process is known as an interfacial process. The end result obtained is isocyanate-free oil droplets dispersed in water which are surrounded by a resilient polyurea wall and are known as microcapsules. Typical processes of this kind and capsules resulting therefrom are described, for example, in U.S. Pat. Nos. 5,225,118, 5,164,126, EP-A780,154, U.S. Pat. Nos. 5,635,211, 5,643,506, and EP-A 535,384.

The prior art production of microcapsules having polyurea walls by an interfacial process requires a hydrophobic oil phase containing a polyisocyanate as primary wall former. The thickness of the later capsule wall is directly proportional to the fraction of the primary wall former, i.e., the polyisocyanate.

On the one hand, increasing wall thickness provides an improvement in important physical and performance properties (e.g., fracture characteristics, sensitivity to rubbing, thermal stability, etc.).

On the other hand, increasing the fraction of polyisocyanate as primary wall former entails making the oil phase and thus later micro-capsules more expensive, since suitable polyisocyanates will be high value added chemicals and hence high ticket items.

Using guanidine compounds as a crosslinker can make it possible to produce capsules having good properties, but in the case of isocyanurate-containing polyisocyanates the fraction in the oil phase and hence the wall fraction in the microcapsules is not less than 10% by weight (cf., Example 10 of EP-A 727,251).

It is an object of the present invention to provide a combination of primary wall former (polyisocyanate) and a suitable crosslinker that even in the case of less than 10% of polyisocyanate in the oil phase leads to microcapsules having properties that are equivalent to the prior art in important performance characteristics. This object is achieved by the present invention.

SUMMARY OF THE INVENTION

The present invention accordingly provides microcapsules for which the walls comprise reaction products of polyisocyanates, guanidine compounds, and optionally amines, wherein the polyisocyanates have an isocyanurate content of at least 30% by weight, based on polyisocyanate, and the walls comprise on average less than 9% by weight, based on the total weight of the microcapsule.

In a preferred embodiment, the average wall fraction comprises less than 7% by weight (especially less than 6% by weight, particularly preferably 5% by weight or less), based on the total weight of the microcapsule.

DETAILED DESCRIPTION OF THE INVENTION

Polyisocyanates containing isocyanurate structures are in particular trimerized diisocyanates of the formula (I)

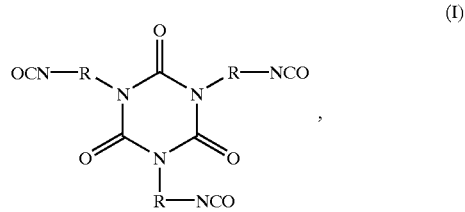

where
R is a divalent aliphatic or cycloaliphatic radical, especially a $C_1$–$C_{10}$ aliphatic radical or a $C_6$–$C_{10}$ cycloaliphatic radical, preferably $(CH_2)_6$, and also their reaction products with a further 2n equivalents of diisocyanates of the formula OCN—R—NCO with isocyanurate formation, hereinafter referred to as oligomeric polyisocyanate containing isocyanurate groups. Preferably n is from 0 to 10, especially from 0 to 4. Preferably R is $(CH_2)_6$.

Preferably more than 50% by weight of all polyisocyanates (especially more than 80% by weight, particularly preferably more than 90% by weight, most preferably even more than 95% by weight) of all polyisocyanates have isocyanurate structures.

In a further preferred embodiment, the fraction of isocyanurate of the formula I, especially where R is $(CH_2)_6$, is more than 30% by weight (especially more than 45% by weight), based on polyisocyanate. The fraction of oligomeric polyisocyanates, especially those based on the formula I where R is $(CH_2)_6$ and $n \geq 1$ and having an isocyanurate structure, is, based on polyisocyanate, preferably more than 20% by weight (especially more than 30% by weight).

The trimer fractions and oligomer fractions of the polyisocyanate can generally be determined using gel permeation chromatography ("GPC").

Polyisocyanate useful in the present invention have a viscosity of not more than 4,500 mPas, preferably not more than 3,500 mPas and further preferably have an NCO content of less than 10% by weight (preferably less than 15% by weight, especially less than 20.0% by weight).

Useful guanidine compounds for producing microcapsules according to this invention include, for example, guanidine compounds of the formula (II)

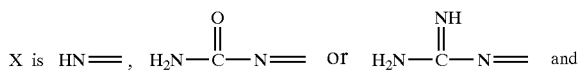

where

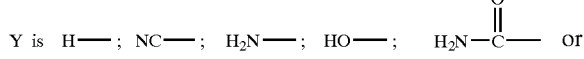

X is HN=, $H_2N-\overset{O}{\overset{\|}{C}}-N=$ or $H_2N-\overset{NH}{\overset{\|}{C}}-N=$ and Y is H—; NC—; $H_2N$—; HO—; $H_2N-\overset{O}{\overset{\|}{C}}-$ or

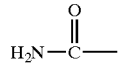

or their salts with acids.

The salts may be, for example, salts of carbonic acid, nitric acid, sulfuric acid, hydrochloric acid, silicic acid, phosphoric acid, formic acid, and/or acetic acid. Salts of guanidine compounds of the formula (II) may be used in combination with inorganic bases in order that the free guanidine compounds of the formula (II) may be obtained from the salts in situ. Useful inorganic bases for this purpose include, for example, alkali metal and/or alkaline earth metal hydroxides and/or alkaline earth metal alkoxides. Preference is given to aqueous solutions or slurries of these bases, especially aqueous sodium hydroxide solution, aqueous potassium hydroxide solution, and aqueous solutions or slurries of calcium hydroxide. Combinations of a plurality of bases may also be used.

It is frequently advantageous to use the guanidine compounds of the formula (II) as salts, since they are commercially available in that form and free guanidine compounds are in some instances sparingly soluble in water or lack stability in storage. When inorganic bases are used, they may be used in stoichiometric, substoichiometric, or superstoichiometric amounts, based on salts of guanidine compounds. Preference is given to using 10 to 100 equivalent % of inorganic base (based on salts of the guanidine compounds). The addition of inorganic bases has the consequence that, for microencapsulation, guanidine compounds having free $NH_2$ groups are available in the aqueous phase for reaction with the polyisocyanates in the oil phase. For microencapsulation, salts of guanidine compounds and bases are advantageously added separately to the aqueous phase.

Preference is given to using guanidine or salts of guanidine with carbonic acid, nitric acid, sulfuric acid, hydrochloric acid, silicic acid, phosphoric acid, formic acid, and/or acetic acid.

It is particularly advantageous to use salts of guanidine compounds with weak acids. These are in equilibrium with the corresponding free guanidine compound in aqueous solution as a consequence of hydrolysis. The free guanidine compound is consumed during the encapsulation process and is constantly regenerated according to the law of mass action. Guanidine carbonate exhibits this advantage to a particular degree. When salts of guanidine compounds with weak acids are used, there is no need to add inorganic bases to release the free guanidine compounds.

Useful guanidine compounds of the formula (II) for the present invention may also be prepared by ion exchange from their water-soluble salts according to the prior art using commercially available basic ion exchangers. The eluate from the ion exchanger can be neutralized directly for capsule wall formation by mixing it with the oil-in-water emulsion.

For example, sufficient guanidine compound can be used so that 0.2 to 4.0 mol of free $NH_2$ groups are introduced into or released in the water phase in the form of guanidine compounds per mole of NCO groups present as polyisocyanate in the oil phase. This amount is preferably 0.5 to 1.5 mol. When guanidine compounds are used in a substoichiometric amount, free NCO groups remain after the reaction with the polyisocyanate. These then generally react with water, which is usually not critical since this reaction gives rise to new, free amino groups capable of crosslinking.

The guanidine compounds, particularly guanidine carbonate, are preferably used in the form of aqueous solutions. The concentration of such solutions is not critical and is generally limited only by the solubility of the guanidine compounds in water. Useful aqueous solutions of guanidine compounds are 1 to 20% by weight in strength, particularly 10 to 20% by weight in strength, for example.

Useful "crosslinkers", i.e., compounds that, when at the phase interface of oil and water, diffuse out of the water phase into the oil phase where they react with the free isocyanate groups, further include aliphatic and/or cycloaliphatic amines possessing at least two primary and/or secondary amino groups, in addition to the guanidine compounds.

The fraction of guanidine compound, especially guanidine carbonate, in the total amount of crosslinker is preferably 50% by weight or more.

Preferred amines have a molecular weight of less than 200 g/mol. Particularly preferred amines are hydrazine, ethylenediamine, diethylene-triamine, triethylenetetramine, tetraethylenepentamine, aminoethyl-piperazine, propylenediamine, N-methyidipropylenetriamine, bis(3-amino-propyl)amine, hexamethylenediamine and also 2,5-diamino-2,5-dimethyl-hexane.

When mixtures of guanidine compounds and amines are used as a crosslinker, their total amount of primary or secondary amino groups can be determined arithmetically or analytically and set in relation to the NCO groups present in the oil phase: per mole of NCO groups present in the oil phase as a polyisocyanate, from 0.2 to 4.0 mol of NCO-reactive amino groups (primary or secondary) can be introduced into the water phase. The general rule is that one NCO group requires one primary or one secondary amino group to react. Secondary reactions are disregarded. When mixtures of guanidine compounds with amines are used, at least half (50 mol %) of the amino groups present in the mixture should be supplied by the guanidine compounds.

According to the invention, the polyisocyanates having a isocyanurate structure may comprise 2 to 8% by weight (preferably 3 to 6% by weight, most preferably 3 to 5% by weight) of the hydrophobic, organic phase.

For the purposes of this invention, the polyisocyanate content of the oil phase in the production of the microcapsules corresponds to the later average wall fraction of the microcapsules.

The contribution to wall construction made by the crosslinker is not taken into account for reasons of simplicity.

The most preferred range of 3 to 5% by weight provides micro-capsule dispersions for which the most important performance properties are equivalent to those of the prior art where wall fractions are higher. In some cases, as demonstrated by the illustrative embodiments, the prior art is even exceeded in some properties. This is astonishing in that it is usually believed that a decreasing wall fraction will result in increased mechanical sensitivity.

The microcapsules of this invention may contain on the inside, dissolved in organic solvents, all those color formers that are commercially available according to the prior art for producing carbonless copy papers and that are known not to react with isocyanates. Examples are compounds of the type of the triphenylmethane compounds, diphenyl-methane compounds, bisindophthalide compounds, bisarylcarbazolyl-methane compounds, xanthene compounds, benzoxazine compounds, thiazine compounds, and spiropyran compounds, especially those known for use as color formers for producing carbonless copy papers. Mixtures of a plurality of color formers can also be used. Some useful color formers are described, for example, in EP-A 591,106, EP-A 315,901, EP-A 234,394, DE-A 3,622, 262, and EP-A 187,329.

The microcapsules prepared according to this invention are useful in principle for encapsulating a multiplicity of chemically different compounds, provided such compounds are soluble in organic solvents and do not react with the isocyanates used or with the aminic crosslinkers or guanidine compounds. Examples are scents, aromas, adhesives, herbicides, pesticides, insecticides, catalysts, pharmaceuticals, and others.

Examples of organic water-immiscible and inert solvents that together with the material to be encapsulated and the polyisocyanate form part of the oil phase during the production of the microcapsules include aromatic, aliphatic, and naphthenic hydrocarbons, carboxylic esters, chlorinated paraffins, oils of animal and vegetable origin, natural fats having melting points in the range from 10° C. to 35° C., liquid fat derivatives, and aromatic and aliphatic ethers boiling above 100° C. Mixtures of a plurality of solvents can also be used.

Microcapsules according to the invention may be produced using an aqueous phase containing emulsifiers, stabilizers and/or anticoalescers. Emulsifiers may also be present in the oil phase. The amount of such additives can be, for example, in the range 0.5 to 10% by weight, based on the respective phase.

The present invention may be carried out using, for example, solvents such as the alkylated aromatics, chloroparaffins, esters, low-melting natural fats and waxes, and natural oils and also low-alcohol esters derived from natural oils.

Preference is given to solvent mixtures of at least one compound selected from group I and at least one compound from group II. Group I solvents are alkylaromatics, such as diisopropylnaphthalenes, halogenated paraffins, such as chloroparaffin, natural fats and oils, such as, for example, coconut fat, and synthetically produced aliphatic or aromatic esters. Group II solvents are naphthenes (i.e., cycloaliphatic hydro-carbons) and also isoparaffins.

Preferably the proportion of group II solvent is at least 40% by weight, especially at least 50% by weight, particularly preferably at least 55% by weight, based on the total amount of organic solvent.

Examples of group I solvents are the following classes of products, that each may also be used in the form of their isomeric mixtures: diisopropylnaphthalene such as KMC® 113 from Rütgers Kureha Solvents GmbH, alkylaromatics such as SURESOL® 290 from Koch Chemical Company or SURESOL® 300 from Koch Chemical Company, phenylxylylethanes such as SAS® 296 from Nippon Soda Co. Ltd., or PXE from Daio Solvents, chloroparaffins such as Meflex® DA from Deutsche ICI GmbH, or Solvocaffaro® from Industrie Chimiche Caffaro S.p.A., or coconut fat such as Cocopur® from Walter Rau G.m.b.H.

Group II solvents include the following products: isoparaffins such as Exxsol® D 100 or NORPAR® or ISOPAR® from Deutsche EXXON CHEMICAL GmbH, or isohexadecane from Degussa-Hüls AG, or naphthenes such as Gravex® 913 from Deutsche Shell AG or Nytex® 800 and similar grades from Nynäs Naphthenics AB.

The invention also provides a process for producing the microcapsules of this invention comprising (1) converting
   (a) an oil phase comprising isocyanurate-containing polyisocyanates, at least one isocyanate-inert water-immiscible solvent, at least one compound to be encapsulated and optionally further additives, and
   (b) a water phase comprising water, stabilizers and optionally further auxiliaries, into an emulsion, preferably using a dispersing apparatus, and (2) adding guanidine compounds and optionally amines as crosslinkers to the emulsion.

Preferably the oil droplet size in the process is equal to the size of the microcapsules.

As the term is used herein, a stabilizer is a compound capable of preventing droplet coalescence and of reducing the surface tension between oil and water phases. Instead of one compound it is also possible to use a plurality of compounds each performing only one function.

A general preparative procedure will now be described by way of example. The individual components are described first.

Solution A

Water containing 0.5 to 10% by weight of a protective colloid. The protective colloid may comprise partially hydrolyzed polyvinyl acetates, polyvinyl alcohol, carboxymethylcellulose and derivatives thereof, gum arabic, or protein hydrolysates. Preference is given to using an about 80% hydrolyzed polyvinyl acetate in a concentration of 0.5 to 2.0% by weight. Suitable commercial products are, for example, Airvol® 523 from Air Products Nederland B.V. or Mowiole® 26–88 from Clariant (Deutschland) GmbH.

Solution B

Solution of the compound or compounds to be encapsulated, especially of the color former, in a water-immiscible isocyanate-inert solvent such as, for example, diisopropylnaphthalene (such as KMC®-113 from Rutgers Kureha Solvents GmbH).

The concentration of the compound to be encapsulated, especially of the color former, in the solvent is preferably 3 to 15% by weight, based on the solution, depending on the solubility of the dyes and the desired depth of shade.

Component C

Cosolvent used as an extender, for example, naphthenic hydrocarbons such as GRAVEX® 913 from Deutsche Shell AG or Nytex® 800 from Nynäs Naphthenics AB or isoparaffins such as Exxsole® D 100 from Deutsche EXXON CHEMICAL GmbH. Naphthenic oils are particularly suitable.

Component D

The isocyanurate-containing polyisocyanates to be used according to the invention. Preference is given here, for example, to hexamethylene diisocyanate isocyanurate (see also formula I where R is $(CH_2)_6$) having an NCO content of at least 15% by weight and an isocyanurate fraction of at least 30% by weight such as, for example, BAYMICRON® OXA WM 111 from Bayer AG, Leverkusen.

Solution E

Demineralized water containing the guanidine compound, especially guanidine carbonate, and optionally amines, especially aliphatic polyamines, in solution. Preference is given to using a solution having a water content of 80 to 90% by weight and a crosslinker content of 20 to 10% by weight.

The process of this invention can be operated continuously as well as batchwise.

Batchwise encapsulation is preferably effected by mixing component D with a corresponding amount of solution B and optionally with component C and adding the resultant solution to a corresponding amount of solution A with high speed stirring until a coarsely divided emulsion has formed. A commercially available high speed dispersing apparatus is then used to emulsify, preferably at temperatures below 40° C., until a finely divided emulsion having a droplet size equal to that of the desired microcapsules has formed.

The speed of the emulsifying apparatus is then reduced and solution E is added, preferably likewise at temperatures below 40° C., to start the formation of the capsule wall. The encapsulating reaction is then completed with moderate stirring, preferably by raising the temperature to 60 to 90° C., preferably at 70 to 80° C.

The result is an aqueous dispersion of the microcapsules according to the invention. The capsule fraction can be between 30 and 65% by weight (preferably 45 to 55% by weight) depending on the amounts and ratios of the input materials.

This form of batchwise encapsulation is procedurally in line with the prior art and does not require special technical measures.

A continuous encapsulation is preferably effected by continuously feeding the input solutions or components A, B, C, and D using suitable precision pumps to the emulsifying apparatus, solution B and component D preferably being premixed by means of commercially available static or dynamic mixers before they are combined with component C in a further static or dynamic mixer. This produces a homogeneous oil phase which contains the oil-dissolved color former, the polyisocyanate and optionally the extender.

This oil phase is then combined with solution A, if necessary mixed once more, and pumped into the emulsifying apparatus. Suitable cooling means can be used to reduce the rise in temperature which occurs in the emulsifying apparatus due to shearing to an acceptable degree. The temperature is preferably controlled in such a way that a temperature of 25 to 40° C. is maintained in the emulsifying apparatus effluent. The finely divided emulsion emerging from the emulsifying apparatus is then continuously combined with solution E and mixed, which may likewise be effected using static or dynamic mixers or stirring elements.

The ensuing wall formation or encapsulation can then be selectively completed in a tank battery or in individual tanks. To this end, the temperature is raised in stages to 90° C. in a tank battery with stirring. The product emerging at the downstream end of the battery constitutes the finished microcapsule dispersion. When ripening is carried out in individual tanks, a sufficient number of tanks for the throughput has to be provided so that the first tank will be empty again when the filling of the last tank has ended (swinging). The heating of the individual tanks can advantageously—as in the case of the battery process—be effected by feeding low pressure steam directly into the product in a controlled manner. Here, too, the purely processing aspect is in line with the prior art.

The invention further provides carbonless copy papers comprising microcapsules according to the invention encapsulating a color former.

These copy papers preferably contain the microcapsules on one side only (i.e., CB or CFB paper). Very particularly preferably the side coated with the microcapsules according to the invention is free of developer. Optionally the other side of the copy paper is coated with a developer (i.e., CFB paper).

Preferred developers are, for example, those of the clay type, of the phenolic resin type and of the zinc salicylate type.

The invention further provides a set of copy papers coated with the microcapsules of the invention. This set is preferably characterized in that it has a layered construction made up of a topsheet, up to 9 intersheets underneath, and a bottom sheet, in which the back of the topsheet (original) is coated with the microcapsules of the invention, the intersheets are coated with a developer on the front and again with the microcapsules on the back, and the bottom sheet is coated only with the developer on the front, the individual sheets being arranged in such a way that in each case the developer-coated side is next to the microcapsule-coated side, so that writing or printing on the topsheet (original) causes the microcapsules of the back and those of the sheets underneath to become crushed, thereby releasing the color former to combine with the developer of the contiguous side to form a color image of the topsheet.

The set preferably comprises up to 7, especially up to 4, intersheets.

The microcapsules of the invention, as well as similar performance characteristics to microcapsules having thicker walls, have the surprising advantage of substantially improved aging characteristics as compared with the corresponding thicker-walled capsules.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all percentages are percentages by weight.

EXAMPLES

Example 1a (Comparative Example)

The microcapsule dispersion was produced in accordance with Example 10 of U.S. Pat. No. 5,635,211 (counterpart of EP-A 727,251) using guanidine as a crosslinker.

Example 1b (Inventive)

Corresponding microcapsules according to the invention were produced under identical conditions as in Example 1a using guanidine carbonate as crosslinker instead of guanidine, and the two types of capsule were compared with regard to their properties (see Table 1). The NCO content in Examples 1a and 1b is 21.6% and the isocyanurate content 96.9%, based on polyisocyanate used. Of that, hexamethylene diisocyanurate trimer accounts for >45% by weight and higher oligomers account for >30% by weight.

TABLE 1

| Ex. | Type | Crosslinker | Wall fraction** (%) | Starting value | Aging characteristics Intensity of copy after aging* 6 days; 70° C.; 75% rel. humidity |
|---|---|---|---|---|---|
| 1a | Comparison | Guanidine | 10 | 53.0 | 46.2 |
| 1b | Invention | Guanidine carbonate | 4 | 52.7 | 49.0 |

*Aging is assessed by comparing the copies of appropriately aged CB (coated back) paper with the copy of the unaged CB paper as a reference. The higher the numerical value, the higher the intensity of the copy.
**Corresponds to polyisocyanate content in oil phase.

The microcapsules according to the invention exhibit substantially better aging characteristics than those of the prior art, despite the substantially reduced wall fraction.

Example 2 (Inventive)

a) Production of Microcapsule Dispersion

Microcapsules for use in carbonless copy papers were produced by initially preparing an oil phase by dissolving a color former consisting of 12 g of crystal violet lactone at 120° C. in 187.2 g of diisopropylnaphthalene and admixing this solution with 20 g of polyisocyanurate from Example 1 at room temperature: 280.8 g of naphthenic isoparaffin mixture were added as an extender. This, oil phase was combined with 442.3 g of a water phase consisting of an aqueous polyvinyl alcohol solution (5.3 g in 437 g of water), the mixture was stirred to provide a coarse pre-emulsion, and the coarse pre-emulsion was emulsified with a mixing siren (8 950 rpm) for 8 minutes to obtain a fine emulsion. The fine emulsion obtained was admixed at room temperature with an aqueous guanidine carbonate solution (7.0 g in 50.7 g of deionized water), and the resultant mixture was heated to 60° C. over 1 hour with stirring and supplementarily stirred at 60° C. for 3 hours to form an approximately 40% strength microcapsule dispersion containing microcapsules having an average size of 7.8 μm. The wall fraction corresponds to the polyisocyanate content of the oil phase, 4% by weight.

b) Production of CFB (Coated Front and Back) Type Carbonless Copy Paper 12.9 g of the microcapsule dispersion obtained according to a), 2.05 g of a spacer based on cellulose (Arbocell® BE600/30), 2.01 g of a binder based on a styrene-butadiene latex (Baystal® P KA8588) and 26.3 g of deionized water were mixed and this mixture was coated with a 40 μ doctor blade onto the back of a commercially available CF paper and dried with a stream of hot air. (A CF paper is coated on the front with a developer for dye precursors.)

Example 3 (Inventive)

Example 2 was repeated, except that a color former recipe providing a black copy was used.

The oil phase used consists of 28.80 g of a color former mixture, 20 g of HDI isocyanurate according to Example 1,180.48 g of diisopropyl-naphthalene and 270.72 g of a naphthenic isoparaffin mixture (Gravex® 913) as an extender.

The color former mixture has the following composition:
5% Pergascript® Blue 12R (Ciba Spec. Chem.)
10% Pergascript® Blue SRB (Ciba Spec. Chem.)
28% Pergascript® Green I2GN (Ciba Spec. Chem.)
57% PSD 184 (Mitsubishi Int. GmbH)

The wall fraction is 4% by weight, based on the total weight of the microcapsule.

Example 4 (Inventive)

Example 3 was repeated, except that the crosslinker used was a mixture of guanidine carbonate and diethylenetriamine.

The oil phase consists of 28.5 g of color former mixture according to Example 3, 223.3 g of diisopropylnaphthalene isomer mixture, 25 g of HDI isocyanurate according to Example 1 and also 223.3 g of a naphthenic hydrocarbon mixture (Nytex® 801) as an extender.

The aqueous fine emulsion was then admixed with an aqueous solution of 4.67 g of guanidine carbonate, 0.89 g of diethylenetriamine, and 52.1 g of deionized water. The wall fraction was 5% by weight.

Example 5 (Inventive)

Example 3 was repeated with a reduced amount of primary wall material.

The oil phase consisted of 29.10 g of the color former mixture of Example 3, 182.4 g of diisopropylnaphthalene (isomer mixture), 273.5 g of a naphthenic isoparaffin mixture (Gravex®-913) as an extender, and 15 g of HDI isocyanurate according to Example 1.

The aqueous fine emulsion was then admixed with an aqueous solution of 5.25 g of guanidine carbonate and 52.55 g of deionized water. The wall fraction was 3% by weight.

The following Table 2 summarizes the properties of the micro-capsules of Examples 2 to 6.

TABLE 2

| Example | Wall fraction (%) | Color former | Capsule size (μm) | Intensity values of copy after aging*** | |
|---|---|---|---|---|---|
| | | | | Starting value** | 6 days; 70° C.; 75% rel. humidity |
| 2 | 4 | Blue | 5.2 | 48.9 | 48.2 |
| 3 | 4 | Black | 5.8 | 49.9 | 46.0 |
| 4 | 5 | Black | 5.5 | 49.7 | 49.0 |
| 6 | 3 | Black | 6.0 | 55.5 | 48.1 |

**Storage at ambient temperature or room conditions.
***The higher the numeric value, the higher the intensity of the copy.

What is claimed is:

1. Microcapsules having walls comprising reaction products of polyisocyanates, guanidine compounds and optionally amines wherein the polyisocyanates have an isocyanurate, content of at least 30% by weight, based on polyisocyanate, and the walls comprise on average less than 9% by weight, based on the total weight of the microcapsule.

2. Microcapsules according to claim 1 wherein the guanidine compounds have the formula (II)

$$H_2N-\overset{\overset{X}{\|}}{C}-NHY, \quad (II)$$

wherein

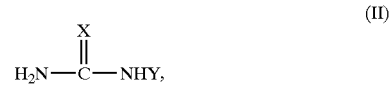

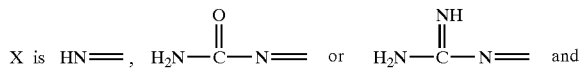

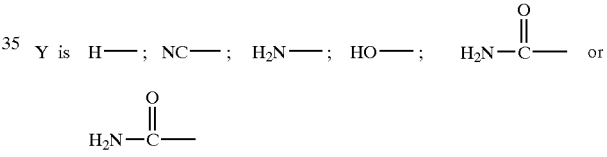

or their salts with acids.

3. Microcapsules according to claim 2 wherein the salts are salts of carbonic acid, nitric acid, sulfuric acid, hydrochloric acid, silicic acid, phosphoric acid, formic acid, and/or acetic acid.

4. Microcapsules according to claim 1 wherein the guanidine compounds are salts of guanidine with carbonic acid, nitric acid, sulfuric acid, hydrochloric acid, silicic acid, phosphoric acid, formic acid, and/or acetic acid.

5. Microcapsules according to claim 1 wherein the guanidine compound is guanidine carbonate.

6. Microcapsules according to claim 1 wherein the polyisocyanates are aliphatic isocyanates containing at least 30% by weight of an isocyanurate having free isocyanate groups.

7. Microcapsules according to claim 1 wherein the polyisocyanates are hexamethylene diisocyanate derivatives with isocyanurate units.

8. Microcapsules according to claim 1 wherein the amines are aliphatic and/or cycloaliphatic amines possessing at least 2 primary and/or secondary amino groups.

9. Microcapsules according to claim 1 wherein the guanidine compound and the aliphatic and/or cycloaliphatic amine are used in a proportion such that the guanidine compound comprises at least 50 mol %, based on the sum total of the guanidine compound and amine.

10. Microcapsules according to claim 9 wherein the guanidine compound is guanidine carbonate.

11. Microcapsules according to claim 1 wherein the average wall fraction comprises less than 7% by weight, based on the total weight of the microcapsule.

12. A process for producing microcapsules according to claim 1 comprising
 (1) converting
  (a) an oil phase comprising isocyanurate-containing polyisocyanates, at least one isocyanate-inert water-immiscible solvent, at least one compound to be encapsulated, and optionally further additives, and
  (b) a water phase comprising water, stabilizer, and optionally further auxiliaries, into an emulsion, and
 (2) adding guanidine compounds and optionally amines as crosslinkers to the emulsion.

13. Carbonless copy papers comprising microcapsules according to claim 1 encapsulating a color former.

14. A set of copy papers having a layered construction comprising a topsheet coated with microcapsules according to claim 1, up to 9 intersheets underneath coated with a developer on the front and with microcapsules on the back, and a bottom sheet coated only with the developer on the front, wherein the individual sheets are arranged in such a way that in each case the developer-coated side is next to the microcapsule-coated side, so that writing or printing on the topsheet (original) causes the microcapsules of the back and those of the sheets underneath to become crushed, thereby releasing the color former to combine with the developer of the contiguous side to form a color image of the topsheet.

* * * * *